(12) United States Patent
Yin et al.

(10) Patent No.: US 10,549,252 B2
(45) Date of Patent: Feb. 4, 2020

(54) DISK REACTOR FOR PRODUCING POLYYCARBONATE

(71) Applicant: Peking Puyuan Institute for Advanced Materials and Technology, Beijing (CN)

(72) Inventors: Penggang Yin, Beijing (CN); Shengli Guo, Beijing (CN); Jihua Shi, Beijing (CN)

(73) Assignee: PEKING PUYUAN INST. FOR ADVANCED MATERIALS & TECH., Beijing (CN)

( * ) Notice: Subject to any disclaimer, the term of this patent is extended or adjusted under 35 U.S.C. 154(b) by 0 days.

(21) Appl. No.: 16/439,727

(22) Filed: Jun. 13, 2019

(65) Prior Publication Data

US 2019/0388864 A1 Dec. 26, 2019

(30) Foreign Application Priority Data

Jun. 20, 2018 (CN) .......................... 2018 1 0636532

(51) Int. Cl.
  *B01J 19/00* (2006.01)
  *B01J 19/18* (2006.01)
(52) U.S. Cl.
  CPC ....... *B01J 19/0053* (2013.01); *B01J 19/0013* (2013.01); *B01J 19/18* (2013.01); *B01J 2219/00094* (2013.01); *B01J 2219/00761* (2013.01)
(58) Field of Classification Search
  CPC .......... B01J 19/00–0013; B01J 19/0053; B01J 19/18; B01J 2219/00049; B01J 2219/00051; B01J 2219/00074; B01J 2219/00087; B01J 2219/00094; B01J 2219/00761
  See application file for complete search history.

(56) References Cited

U.S. PATENT DOCUMENTS

2003/0027941 A1* 2/2003 Sawaki ................ C08G 64/307 525/461
2017/0153561 A1* 6/2017 Xu ....................... B01F 7/00466

FOREIGN PATENT DOCUMENTS

WO WO-2017158611 A1 * 9/2017 ............ C12M 41/26

* cited by examiner

*Primary Examiner* — Natasha E Young
(74) *Attorney, Agent, or Firm* — Im IP Law; Chai Im; C. Andrew Im

(57) ABSTRACT

A disk reactor for production of polycarbonate includes a cylinder provided with an end cover at each end. The cylinder is provided with a material inlet, a product outlet and a gas phase port thereon. The cylinder is provided with a driving shaft therein. The driving shaft is provided with plural disks at different spaces thereon. Each disk has slope different from each other. Each disk is provided with plural transverse blades and plural transverse scrapers thereon. A scraper blade is arranged between two disks and fixed on the driving shaft. Compared with the prior disk reactors, the disk reactor fully considers the change of melt viscosity in the polymerization process, simultaneously increases the mass transfer area of the reactor, has good film forming and surface renew performance and high light component removal efficiency, and can produce polycarbonate with high molecular weight and uniform quality.

10 Claims, 3 Drawing Sheets

DISK REACTOR FOR PRODUCING POLYYCARBONATE

RELATED APPLICATION

The application claims the benefit of the Chinese patent application CN 201810636532.2 filed Jun. 20, 2018, which is incorporated herein by reference in its entirety.

FIELD OF THE INVENTION

The present invention relates to a novel disk reactor for production of polycarbonate.

BACKGROUND OF THE INVENTION

In the production process of polyester, the condensation reaction is gradually carried out, and the molecular weight of polymer is improved continuously. The reaction belongs to the reversible balanced reaction and reaction equilibrium constant is small, thus the balance is guaranteed by continuously removing small molecules generated by the reaction under the vacuum operation conditions. In the early stage of the production process, the viscosity of the system is small, and the small molecules are relatively easy to enter the gas phase, thus the process is carried out by reaction control; and in the later stage of the production process, the operation viscosity of the system is gradually increased, thus the process is carried out by diffusion control. Therefore, most of the polyester industry adopts multistage condensation, and uses a horizontal surface renewal reactor with good mass transfer performance as a final condensation reactor.

In the patents of a series of disclosed disk reactors, the described structure mainly comprises a sealed transverse cylinder. The cylinder is arranged with a material inlet and a material outlet thereon, and is pivoted with a driving shaft therein. The driving shaft is fixedly arranged with plural groups of ring disks. A plural of parallel axial film-drawing steel plates is fixedly arranged on the ring disk or on the side portion of the ring disk. The disk reactor employs the ring disks or axial film-drawing steel plates to form a vertical film or a parallel film during operation, so as to increase the amount of material liquid film carried in the internal space of the reactor, increase the mass transfer area of the reactor, and effectively improve the stirring efficiency. The disk reactor has good reaction effect when the material viscosity is low in the early stage of reaction. However, with the deepening of the reaction and the increase of the material viscosity, such structure hinders the material flow to cause slow reaction speed. Furthermore, the retention time of the material on the surface of the reactor is too long, which results in excessive heating time to cause crosslinking side reaction.

SUMMARY OF THE INVENTION

Therefore, it is an object of the claimed invention to provide the novel disk reactor for production of polycarbonate.

The novel disk reactor for production of polycarbonate comprises a cylinder provided with an end cover at each end, wherein the cylinder is provided with a material inlet, a product outlet and a gas phase port thereon; the cylinder is provided with a driving shaft therein; the driving shaft is provided with plural disks at different spaces thereon; each disk has slope different from each other; each disk is provided with plural transverse blades and plural transverse scrapers thereon; and a scraper blade is arranged between two disks, and fixed on the driving shaft.

The novel disk reactor for production of polycarbonate changes the distance between the disks and the axial inclination angle of the disk along the melt viscosity increase direction, so that the flow space of the material and retention time of the material on the disk are in accordance with the material viscosity. The designed transverse blades and transverse scrapers effectively increase the film forming amount of the internal unit volume of the reactor, increase the mass transfer area of the reactor, and promote the removal of low-molecular-weight products. The arrangement of the transverse scraper blades increases the flow and exchange of the molten material, which effectively improves mass transfer and film forming efficiency. The transverse scraper blades endow the reaction system with certain self-cleaning capacity, so as to obtain the product with large molecular weight and uniform quality.

Further, the novel disk reactor for production of polycarbonate may also have the following additional technical features:

Further, the driving shaft is a hollow shaft; two ends of the hollow shaft penetrate from the end covers at two ends of the cylinder, and are supported by bearings fixed to the end covers; and a connection portion of the hollow shaft and the cylinder adopts a dual sealing system which includes static mechanical sealing and sealing oil sealing.

Further, each disk is fixed on the driving shaft through a key groove; every adjacent 5-10 disks form a group, and the disks in one group are spaced from each other at the same distance; all the disks are divided into 4-8 groups, and the distance between the groups of the disks is equal; and the distance between the disks in each group becomes larger by group from the material inlet to the product outlet.

Further, distances between the disks in the first and last groups are d and 1.5-2d from the material inlet to the product outlet, respectively.

Further, the value of the radial inclination degree tan θ of the disk gradually decreases at 0.2-0 from the material inlet to the product outlet; and the disk is tilted from the center of the disk to the edge of the disk.

Further, the number of the transverse blades on each disk is 3-8; and the number of the transverse blades on each disk is equal.

Further, the transverse scrapers are arranged on the transverse blades; each group of the transverse scrapers comprises two scrapers, and is symmetrically fixed along the transverse blades; and 2-3 groups of transverse scrapers are arranged on each disk.

Further, the transverse scraper blade has the edged tip, and sickle-shaped cross section.

Further, the jacket is arranged outside the cylinder; and the jacket is heated by a liquid-phase heat medium.

Further, the amount of the material added into the disk reactor is 35-50% of the volume of the disk reactor; the material inlet viscosity is 150-450 Pa·s; the material inlet temperature is 270-290° C.; the product outlet temperature is 280-300° C.; and the operation pressure is 50-500 Pa.

Additional aspects and advantages of the invention will be set forth in part in the description which follows and, in part, will be obvious from the description, or may be learned by practice of the invention.

Figure 1:
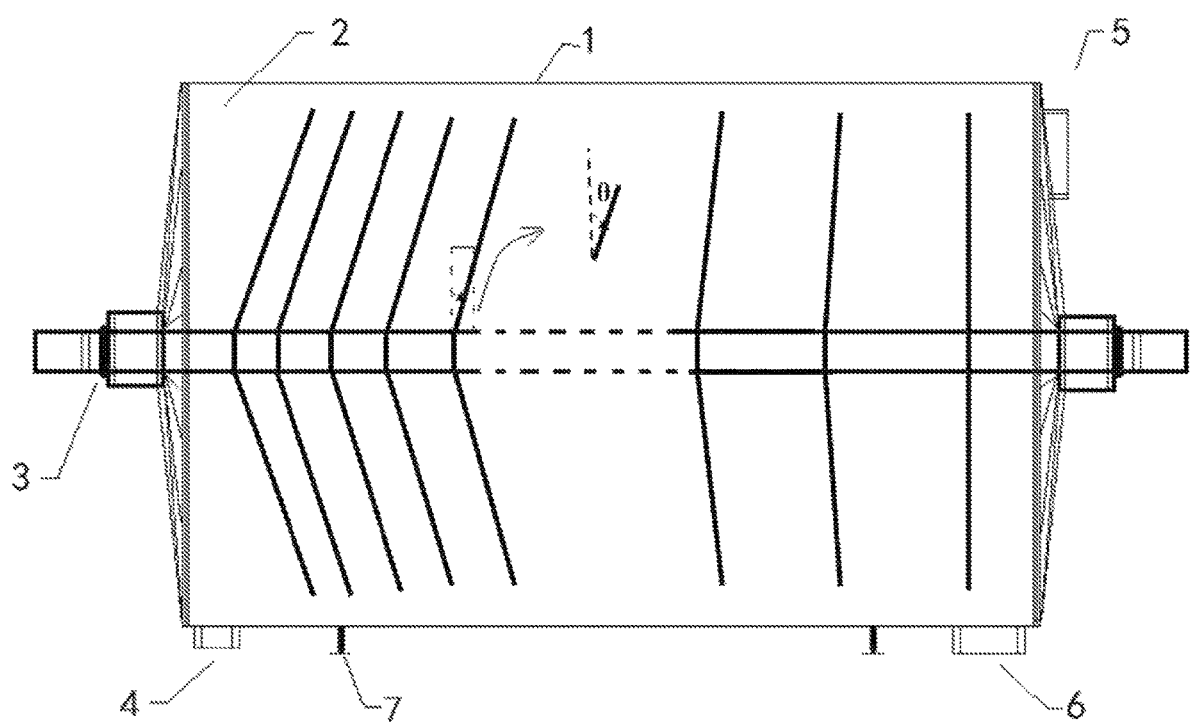
FIG. 1 is the novel disk reactor for production of polycarbonate in the present invention.

Wherein, 1—cylinder; 2—disk; 3—driving shaft; 4—material inlet; 5—gas phase port; 6—product outlet; 7—disk reactor support; 8—transverse scraper blade; 9—transverse scraper; and 10—transverse blade.

DETAILED DESCRIPTION OF THE EMBODIMENTS

An embodiment of the present invention is described in detail below, and exemplary embodiments of the present invention are shown in the accompanying drawings, wherein same or similar reference numerals designate the same or similar elements or elements having the same or similar functions. By following with reference to the embodiments described are exemplary, and are intended for explaining the present invention and should not be construed as limiting the present invention.

Figure 2:
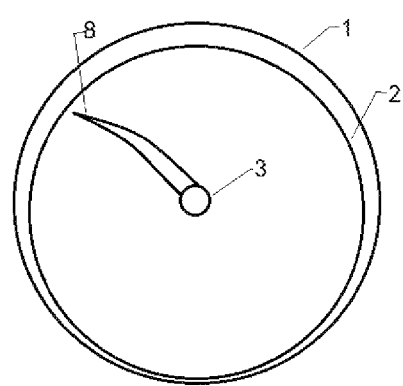
FIG. 2 is the side view of the transverse scraper blade.
Figure 3:
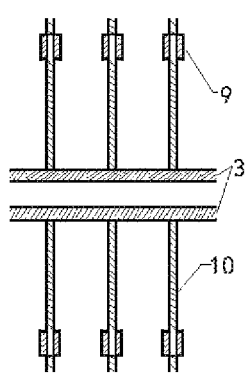
FIG. 3 is the front view of a group of the transverse scraper.

Referring to FIG. 1-3, the novel disk reactor for production of polycarbonate comprises a cylinder 1 provided with an end cover at each end. The cylinder is provided with a material inlet 4, a product outlet 6 and a gas phase port 5 thereon. The cylinder 1 is provided with a driving shaft 3 therein. The driving shaft 3 is provided with plural disks 2 at different spaces thereon. Each disk 2 has slope different from each other, and each disk 2 is provided with plural transverse blades 10 and plural transverse scrapers 9 thereon. The scraper blade 8 is arranged between two disks 2 and fixed on the driving shaft 3.

The novel disk reactor for production of polycarbonate changes the distance between the disks and the axial inclination angle of the disk along the melt viscosity increase direction, so that the flow space of the material and the retention time of the material on the disk are in accordance with the material viscosity. The designed transverse blades and transverse scrapers effectively increase the film forming amount of the internal unit volume of the reactor, increase the mass transfer area of the reactor, and promote the removal of low-molecular-weight products. The arrangement of the transverse scraper blades increases the flow and exchange of the molten material, which effectively improves mass transfer and film forming efficiency. The transverse scraper blades can endow the reaction system with certain self-cleaning capacity, so as to obtain the product with large molecular weight and uniform quality.

Advantageously, the driving shaft 3 is a hollow shaft, and its axis is below the axis line of the cylinder; two ends of the hollow shaft penetrate from the end covers at two ends of the cylinder, and are supported by bearings fixed to the end covers; and a connection portion of the hollow shaft and the cylinder 1 adopts a dual sealing system which includes static mechanical sealing and sealing oil sealing.

Advantageously, each disk 2 is fixed on the driving shaft 3 through a key groove; every adjacent 5-10 disks 2 form a group, and the disks 2 in one group are spaced from each other at the same distance; all the disks 2 are divided into 4-8 groups, and the distance between the groups of the disks 2 is equal; and the distance between the disks 2 in each group becomes larger by group from the material inlet 4 to the product outlet 6.

Advantageously, distances between the disks 2 in the first and last groups are d and 1.5-2d from the material inlet 4 to the product outlet 6, respectively.

Advantageously, the value of the radial inclination degree tan θ of the disk 2 gradually decreases at 0.2-0 from the material inlet 4 to the product outlet 6; the disk 2 is tilted from the center of the disk 2 to the edge of the disk 2; and the center of the disk 2 is thick, the edge of the disk 2 is thin, and two sides of the disk 2 are symmetrical to each other.

Advantageously, the number of the transverse blades 10 on each disk 2 is 3-8; and the number of the transverse blades 10 on each disk 2 is equal. The transverse blades between the adjacent disks are alternatively staggered from each other at a certain fan angle.

Advantageously, the transverse scrapers 9 are arranged on the transverse blades 10; each group of the transverse scrapers 9 comprises two scrapers, and is symmetrically fixed along the transverse blades 10; and 2-3 groups of transverse scrapers 9 are arranged on each disk 2.

Advantageously, the transverse scraper blade 8 is fixed between each group of disks 2; and the transverse scraper blade 8 has the edged tip, and sickle-shaped cross section.

Advantageously, the jacket is arranged outside the cylinder 1; and the jacket is heated by a liquid-phase heat medium.

Advantageously, the amount of the material added into the disk reactor is 35-50% of the volume of the disk reactor; the material inlet viscosity is 150-450 Pa·s; the material inlet temperature is 270-290° C.; the product outlet temperature is 280-300° C.; and the operation pressure is 50-500 Pa.

Advantageously, the cylinder 1 and the end cover is made of 904L-Q345R composite material, the jacket is made of Q345R steel plate, the driving shaft 3 is made of 904L forging, and the inner parts are made of 904L.

In application, the driving shaft (3) drives the disk (2) to rotate, the disk (2) carries over the material when rotating to form an adhesion film on the disk (2), an adhesion film and a tensile film on the transverse blade (10), and a tensile film on the transverse scraper (9), and the liquid film drops under the gravity when rotating and new liquid film continuously forms along with the rotation, so that the material can completely react to remove gas. During the reaction of the material, the viscosity of the material increases continuously, and the required flow space increases, thus the distance between the disks is changed in the design process to achieve the purpose. In addition, the retention time of the material on the disk (2) should not be too long, thus the disk is tilted, and has the inclination degree gradually decreased along the material viscosity increase direction, which can guarantee the equivalent retention time of the material on each disk. The transverse blades between the adjacent disks (2) are alternatively staggered from each other at a certain fan angle, to thereby form the film independently and improve the mass transfer and film forming efficiency. The transverse scraper blade (8) rotates along with the driving shaft, continuously performs surface renew on the reaction material among the disks and cylinder walls, and gradually transports the material to the outlet end. The removed gas is discharged from the reactor through the gas phase port (5) on the upper portion of the cylinder to enter a recovery unit. The completely reacted material is discharged from the product outlet (6) at 280-300° C.

In summary, compared with the prior disk reactors, the inventive disk reactor fully considers the change of melt viscosity in the polymerization process, simultaneously increases the mass transfer area of the reactor, has good film forming and surface renew performance and high light component removal efficiency, and can produce polycarbonate with high molecular weight and uniform quality.

In the description of the present specification, reference to the term "one embodiment", "some embodiments", "an example", "a specific example", or "some examples" etc., means that a particular feature of the described embodiment or example described, structure, material, or characteristic included in the present invention, at least one embodiment or example. In the present specification, the term of the above schematic representation is not necessary for the same embodiment or example. Furthermore, the particular features, structures, materials, or characteristics described may be in any one or more of the example embodiments in combination or in a suitable manner. Furthermore, different embodiments or examples, and various exemplary embodiments or features in the embodiments are not mutually contradictory situation, those skilled in the art can be described in this specification and the binding composition.

Although the above has been illustrated and described embodiments of the present invention, it is understood that the above-described embodiments are illustrative and are not to be construed as limiting the invention, one of ordinary skill in the art within the scope of the present invention described above can be example changes, modifications, substitutions and variations.

What is claimed is:

1. A disk reactor to produce polycarbonate, comprising a cylinder having an end cover at each of the cylinder's two ends, wherein:
   the cylinder comprises a material inlet, a product outlet, a gas phase port and a driving shaft;
   the driving shaft comprises a plurality of disks spaced apart from one another;
   each of the disks is sloped differently from the other disks;
   each of the disks comprises a plurality of transverse blades and a plurality of transverse scrapers; and
   a scraper blade is arranged between each adjacent pair of the disks and is fixed on the driving shaft.

2. The disk reactor in claim 1, wherein:
   the driving shaft is a hollow shaft;
   two ends of the hollow shaft penetrate from the end covers at two ends of the cylinder and are supported by bearings fixed to the end covers; and
   a connection portion of the hollow shaft and the cylinder adopts a dual sealing system which includes static mechanical sealing and sealing oil sealing.

3. The disk reactor in claim 1, wherein:
   each of the disks is fixed on the driving shaft through a key groove;
   every adjacent 5-10 disks of the disks form a disk group;
   the disks in a same disk group are spaced from each other at a same distance;
   all of the disks are divided into 4-8 disk groups;
   a distance between the disk groups is equal; and
   a first distance between adjacent disks in a first disk group which is closer to the product outlet but more distant from the material inlet is greater than a second distance between adjacent disks in a second disk group which is closer to the material inlet but more distant from the product outlet.

4. The disk reactor in claim 3, wherein:
   the first distance between adjacent disks in the first disk group which is closest to the product outlet but most distant from the material inlet is 1.5-2d; and
   the second distance between adjacent disks in the second disk group which is closest to the material inlet but most distant from the product outlet is d.

5. The disk reactor in claim 1, wherein:
   radial inclination of the disk (tan θ) gradually decreases at 0.2-0 from the material inlet to the product outlet; and
   the disk is tilted from a center of the disk to an edge of the disk.

6. The disk reactor in claim 1, wherein:
   each of the disks includes 3-8 transverse blades; and
   each of the disks includes a same number of the transverse blades.

7. The disk reactor in claim 1, wherein:
   the transverse scrapers are arranged on the transverse blades;
   a group of the transverse scrapers includes two scrapers, which are symmetrically fixed along the transverse blades; and
   2-3 of the groups of the transverse scrapers are arranged on each of the disks.

8. The disk reactor in claim 1, wherein the transverse scraper blade has an edged tip and has a sickle-shaped cross section.

9. The disk reactor in claim 1, wherein:
   a jacket is arranged outside the cylinder; and
   the jacket is heated by a liquid-phase heat medium.

10. The disk reactor in claim 1, wherein:
    materials added into the disk reactor is 35-50% of a volume of the disk reactor;
    viscosity of the materials at the material is 150-450 Pa·s;
    temperature at the material inlet is 270-290° C.;
    temperature at the product outlet is 280-300° C.; and
    operation pressure in the disk reactor is 50-500 Pa.

\* \* \* \* \*